P. Fild,
Ice Cream Mold.
No. 86,519. Fig. 1. Patented Feb. 2, 1869.
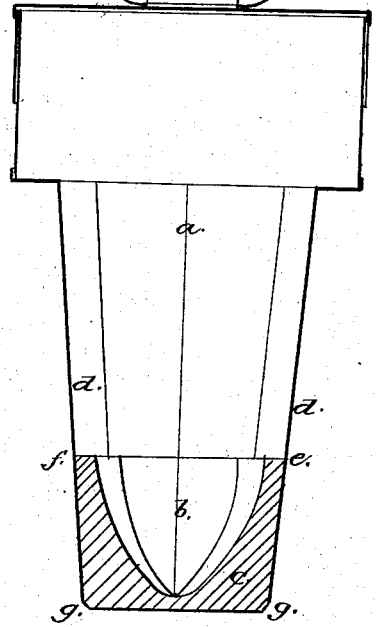
Fig. 2.
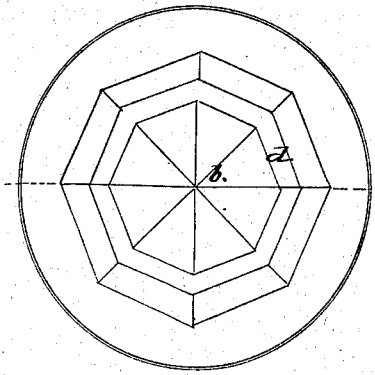
Witnesses:
J. H. Adams.
E. L. Lipe.
Inventor:
Peter Fild.

PETER FILD, OF BOSTON, MASSACHUSETTS.

Letters Patent No. 86,519, dated February 2, 1869.

IMPROVEMENT IN ICE-CREAM MOULDS.

The Schedule referred to in these Letters Patent and making part of the same.

Be it known that I, PETER FILD, of Boston, in the county of Suffolk, and State of Massachusetts, have invented a new and useful Improvement in Ice-Cream Moulds, of which the following is a full, clear, and exact description, reference being made to the accompanying drawings, making a part of this specification, in which—

Figure 1 represents a transverse vertical section of an ice-cream freezer, embodying my improvement, and Figure 2 is a plan view of the same, with the cover removed.

The nature of my invention consists in making the end of the ice-cream mould, or that portion which gives form to the upper part of the ice-cream when made in the mould, of solid cast-metal, for the purpose of preventing the mould from being jammed or injured, and thus defacing the ornamentation. It also serves to keep the mould in an upright position when placed upon its end.

Ice-cream moulds, as ordinarily made, are constructed of sheet-metal, and so as to give the ice-cream any desired form of ornamentation.

When it is desired that they should stand upon their ends, a sheet-metal rim is sometimes attached for this purpose; but this, after being used a short time, becomes bent and useless.

It is sometimes necessary, before removing the ice-cream from the mould, to give the latter a blow, for the purpose of loosening the ice, to enable it to be detached from the sides of the mould more readily. In this way, the ends become bruised and battered to such an extent as to cause the moulds to leak, which renders them useless, when they require to be repaired.

By my invention, all this difficulty is removed, and the end of the mould may be subjected to very severe blows without injury.

In the drawings, $d$ represents the casing of an ice-cream mould, in the end of which is a solid metal casting, $c$, forming a portion of the mould, as shown.

The solid portion is constructed and attached in the following manner:

The casing $d$ is open at its smaller end, at $g\ g$.

A solid block is fitted closely within the casing, the smaller end, $b$, being formed with any desirable ornamentation on its outer surface.

The casing being then placed with its smaller end upward, and the inner surface being properly prepared to make the casting adhere, the melted metal is poured in until the space between the points $f\ g\ g\ e$ is filled, as designated at $c$. Lead, or any heavy composition not likely to injure the cream, can be used for the purpose.

A mould thus constructed will readily maintain an upright position when placed with its smaller end on the ground, or when within the freezer. The ice-cream can be more easily removed, as a severe blow can be given to the end without danger of injury to the casing, and they will also bear the rough handling to which they are subjected in transportation without the injurious effects incident to those made in the usual manner.

Having thus described my invention,

What I claim as new, and desire to secure by Letters Patent, is—

The combination, with an ice-cream mould, of a solid metal end, as and for the purpose set forth.

In testimony whereof, I have signed my name to this specification, in the presence of two subscribing witnesses.

PETER FILD.

Witnesses:
J. H. ADAMS,
M. S. G. WILDE.